United States Patent Office 3,651,134
Patented Mar. 21, 1972

3,651,134
5-ARYLALKOXY-1-HYDROXY-2-NAPHTHOIC ACIDS
Bill Elpern, White Plains, Harris J. Shapiro, Bronx, and Harold Soloway, New Rochelle, N.Y., assignors to USV Pharmaceutical Corporation
No Drawing. Filed Feb. 10, 1970, Ser. No. 10,293
Int. Cl. C07c 65/14
U.S. Cl. 260—520                                        4 Claims

ABSTRACT OF THE DISCLOSURE

Derivatives of 3,5-dihydroxy-2-naphthoic acid of the formula

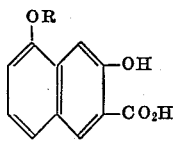

wherein R is phenyl-lower alkyl, halophenyl-lower alkyl or trifluoromethyl-phenyl-lower alkyl are potent antimicrobial agents.

---

This invention relates to new organic compounds having valuable biological activity and to a process for the preparation of said compounds. In particular, the invention relates to derivatives of 3,5-dihydroxy-2-naphthoic acid of the formula

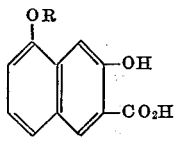

wherein R is phenyl-lower alkyl, halophenyl-lower alkyl such as mono- or dichlorophenyl-lower alkyl, mono- or dibromophenyl-lower alkyl, mono- or diiodophenyl-lower alkyl, nitrophenyl-lower alkyl or trifluoromethylphenyl-lower alkyl, and their salts.

The lower alkyl group contains from 1 to 5 carbon atoms and may be branched or straight chain. Preferably, R is dichlorobenzyl or trifluoromethyl-benzyl.

The salts include those of amines such as ammonia, triethanolamine, diethylamine, choline, and the like, as well as salts of such metals as sodium, potassium, calcium, iron, copper, zinc, and mercury.

According to the process of this invention the compounds are prepared by heating substantially equimolar quantities of a 2-naphthoic acid of the formula

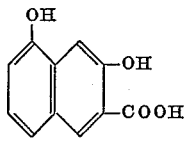

with a chloride of the formula

Cl—R wherein R is the same as above, in a solution of ethanol in the presence of a twice molar amount of sodium. The crude product is present in the reaction mixture as the sodium salt. In those cases where it precipitated, it was filtered off and neutralized by treatment with dilute hydrochloric acid. Otherwise, dilute hydrochloric acid was added directly to the reaction filtrate and the precipitated material separated by filtration. In either case, the crude product was purified by recrystallization.

The invention will be more fully illustrated in the examples which follow, which examples are given by way of illustration and are not to be considered as limiting.

EXAMPLE I 5-(2,4-dichlorobenzyloxy)-3-hydroxy-2-naphthoic acid

To a stirred solution of 9.2 g. (0.4 g. atom) of sodium in 400 cc. of ethanol, was added 41 g. (0.2 mole), 3,5-dihydroxy-2-naphthoic acid. After ½ hr. 43 g. (0.22 mole) 2,4-dichlorobenzyl chloride was added. The reaction mixture was warmed under reflux for 24 hrs. The hot reaction mixture was filtered and the filtrate cooled in an ice bath. A tan solid precipitated out, yielding 32 g. (M.P. 215–35) of the crude sodium salt of the product. Recrystallization from 250 cc. of water yielded 28 g. (M.P. 200–260° C.) of material which was then stirred with 500 cc. of water, heated to reflux and then acidified with 3 N hydrochloric acid, during which time a yellow precipitate formed. The heating and stirring was continued for 1 hr. Upon filtration, 25 g. (M.P. 220–40° C.) of crude product was obtained. Recrystallization first from i-propanol, then acetone and finally from acetonitrile, furnished 5-(2,4-dichlorobenzyloxy) - 3 - hydroxy - 2 - naphthoic acid, M.P. 237–40° C. in 9% yield (6.3 g.).

EXAMPLE II 5-(2-phenylethoxy)-3-hydroxy-2-naphthoic acid

To a stirred solution of 5.1 g. (0.22 g. atom) of sodium in 200 c. of ethanol, was added 20.5 g. (0.10 mole) 3,5-dihydroxy-2-naphthoic acid. Followed by 20.4 g. (0.11 mole) 2-bromoethylbenzene. The reaction mixture was heated under reflux for 24 hrs. and then filtered. The filtrate was stirred and treated with 50 cc. 3 N hydrochloric acid during which time a yellow precipitate formed. The stirring was continued for 1 hr. and the crude product filtered (M.P. 194–6° C.). Recrystallization first from acetonitrile and then from methanol furnished 5-(2-phenylethoxy)-3-hydroxy-2-naphthoic acid, M.P. 198–200° C. in 12% yield (3.6 g.).

In accordance with the procedures described in the above examples, the additional compounds shown in the table below were prepared.

| R: | M.P. ° C. |
|---|---|
| $PhCH_2$ | 217–9 |
| $4\text{-}Cl\text{-}PhCH_2$ | 255–7 |
| $3,4\text{-}Cl_2PhCH_2$ | 239–42 |
| $2,6\text{-}Cl_2PhCH_2$ | 234–6 |
| $PhCH_2CH_2CH_2CH_2$ | 158–61 |
| $PhCH_2CH_2CH_2$ | 192–4 |
| $3,4\text{-}Cl_2PhCH_2CH_2CH_2$ | 208–10 |
| $3\text{-}F_3C\text{-}PhCH_2$ | 228–30 |

The compounds of the present invention exhibit strong antimicrobial activity at the order of about 2 mg. percent against *Staph. aur.* and *Bac. subt.*, using the standard agar plate method, and would be useful as disinfectants and germicides.

We claim:
1. A compound of the formula

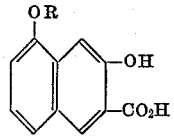

wherein R is phenyl-lower alkyl, halophenyl-lower alkyl, or trifluoromethylphenyl-lower alkyl.
2. A compound according to claim 1 wherein R is 3-trifluoromethylbenzyl.
3. A compound according to claim 1 wherein R is 3,4-dichlorobenzyl.
4. A compound according to claim 1 wherein R is 2,4-dichlorobenzyl.

(References on following page)

References Cited

UNITED STATES PATENTS 1,947,819  2/1934  Zitscher et al. _____ 260—520

OTHER REFERENCES

Roberts & Caserio, "Basic Principles of Organic Chemistry," W. A. Benjamin Inc., New York, N.Y. (1965), p. 906.

Roberts & Caserio, ibid, p. 911.

Handford et al., Chem. Abst. 59, 9923b (1963).

LORRAINE A. WEINBERGER, Primary Examiner

J. F. TERAPANE, Assistant Examiner

U.S. Cl. X.R.

260—651; 424—317